United States Patent
Motin et al.

(10) Patent No.: US 10,995,775 B2
(45) Date of Patent: May 4, 2021

(54) HYDRAULIC BOOST VALVE

(71) Applicant: Ford Global Technologies, LLC, Dearborn, MI (US)

(72) Inventors: Abdul Motin, Canton, MI (US); Raymond Theodore Gage, Northville, MI (US); Derek Kinch, Ypsilanti, MI (US); Sylvia Chen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 16/267,869

(22) Filed: Feb. 5, 2019

(65) Prior Publication Data

US 2020/0248723 A1    Aug. 6, 2020

(51) Int. Cl.
 *F15B 13/04* (2006.01)
(52) U.S. Cl.
 CPC ................ *F15B 13/0405* (2013.01)
(58) Field of Classification Search
 CPC ............ F15B 13/0405; F16K 31/1221; Y10T 137/8733; Y10T 137/87418; Y10T 137/7849; Y10T 137/86726; Y10T 137/87338
 See application file for complete search history.

(56) References Cited

U.S. PATENT DOCUMENTS

| | | | | |
|---|---|---|---|---|
| 3,598,359 | A | * | 8/1971 | Rich ................ B62D 5/08 251/44 |
| 4,080,872 | A | | 3/1978 | Shiokawa |
| 4,504,081 | A | * | 3/1985 | Shimizu ............ B60G 17/0408 137/469 |
| 4,742,846 | A | | 5/1988 | Dibartolo |
| 5,080,131 | A | * | 1/1992 | Ono ................... G01F 1/6842 137/486 |
| 5,188,141 | A | | 2/1993 | Cook |
| 5,253,668 | A | | 10/1993 | Mills |
| 6,832,632 | B1 | | 12/2004 | Wallace |
| 6,990,996 | B2 | | 1/2006 | Stafford |
| 2009/0127028 | A1 | | 5/2009 | He |

FOREIGN PATENT DOCUMENTS

EP    2051897 B1    10/2011

\* cited by examiner

*Primary Examiner* — Reinaldo Sanchez-Medina
*Assistant Examiner* — Nicole Gardner
(74) *Attorney, Agent, or Firm* — Vincent Mastrogiacomo; Brooks Kushman P.C.

(57) ABSTRACT

A hydraulic boost valve includes a housing, a valve seat, and a piston. The housing defines an axially extending internal cavity, a slot that extends radially outward from the internal cavity within the housing, and an outlet port that establishes fluid communication between the slot and a fluid output circuit. The valve seat is secured to an end of the housing. The valve seat defines first and second orifices. The first orifice establishes fluid communication between a fluid input circuit and the outlet port via the slot. The second orifice establishes fluid communication between the fluid input circuit and the fluid output circuit. The piston is disposed within the internal cavity such that the slot is positioned between the piston and an external wall of the housing.

20 Claims, 6 Drawing Sheets

HYDRAULIC BOOST VALVE

TECHNICAL FIELD

The present disclosure relates to boost valves that are utilized in hydraulic systems such as a hydraulic system in a vehicle transmission.

BACKGROUND

Boost valves are utilized to increase a flow rate of fluid through a hydraulic system.

SUMMARY

A hydraulic boost valve includes a housing, a valve seat, and a piston. The housing defines an axially extending internal cavity, a slot that extends radially outward from the internal cavity within the housing, and an outlet port that establishes fluid communication between the slot and a fluid output circuit. The valve seat is secured to an end of the housing. The valve seat defines first and second orifices. The first orifice establishes fluid communication between a fluid input circuit and the outlet port via the slot. The second orifice establishes fluid communication between the fluid input circuit and the fluid output circuit. The piston is disposed within the internal cavity such that the slot is positioned between the piston and an external wall of the housing. The piston includes a protrusion that extends upward from a top surface of the piston. The protrusion engages the valve seat along a contact line when the piston is in a closed position to obstruct fluid communication between the first orifice and the outlet port via the slot. The protrusion disengages the valve seat when the piston is in opened position to establish to fluid communication between the first orifice and the outlet port via the slot.

A hydraulic boost valve includes a housing, a valve seat, and a piston. The housing defines an axially extending internal cavity, a slot that extends radially outward from the internal cavity within the housing, and an outlet port that establishes fluid communication between the slot and a fluid output circuit. The valve seat is secured to an end of the housing. The valve seat defines first and second orifices. The first orifice establishes fluid communication between a fluid input circuit and the outlet port via the slot. The second orifice establishes fluid communication between the fluid input circuit and the fluid output circuit. The piston is disposed within the internal cavity such that the slot is positioned between the piston and an external wall of the housing. The piston is configured to transition to an opened position to establish to fluid communication between the first orifice and the outlet port via the slot. The piston is also configured to transition to a closed position to obstruct fluid communication between the first orifice and the outlet port via the slot.

A hydraulic boost valve includes a housing, a valve seat, and a piston. The housing defines an axially extending internal cavity and an outlet port. The outlet port is in fluid communication with a fluid output circuit. The valve seat is secured to an end of the housing. The valve seat defines first and second orifices. The first orifice establishes fluid communication between a fluid input circuit and the outlet port. The second orifice establishes fluid communication between the fluid input circuit and the fluid output circuit. The piston is disposed within the internal cavity. The piston includes a protrusion that extends upward from a top surface of the piston. The protrusion engages the valve seat along a contact line when the piston is in a closed position to obstruct fluid communication between the first orifice and the outlet port. The protrusion disengages the valve seat when the piston is in opened position to establish to fluid communication between the first orifice and the outlet port.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
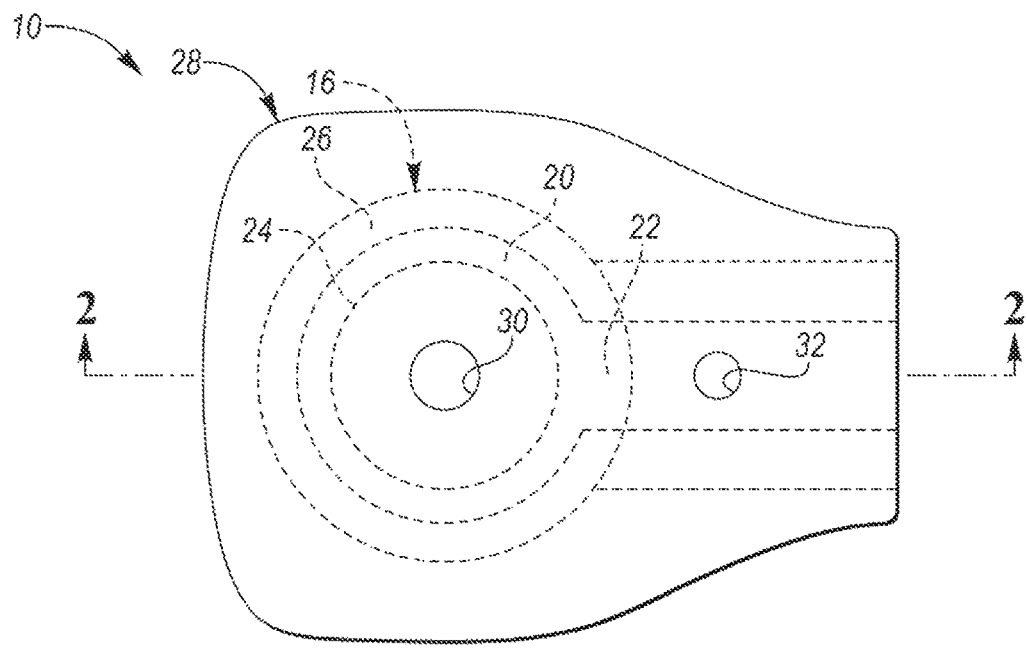
FIG. 1 is a top view of a boost valve.
Figure 2:
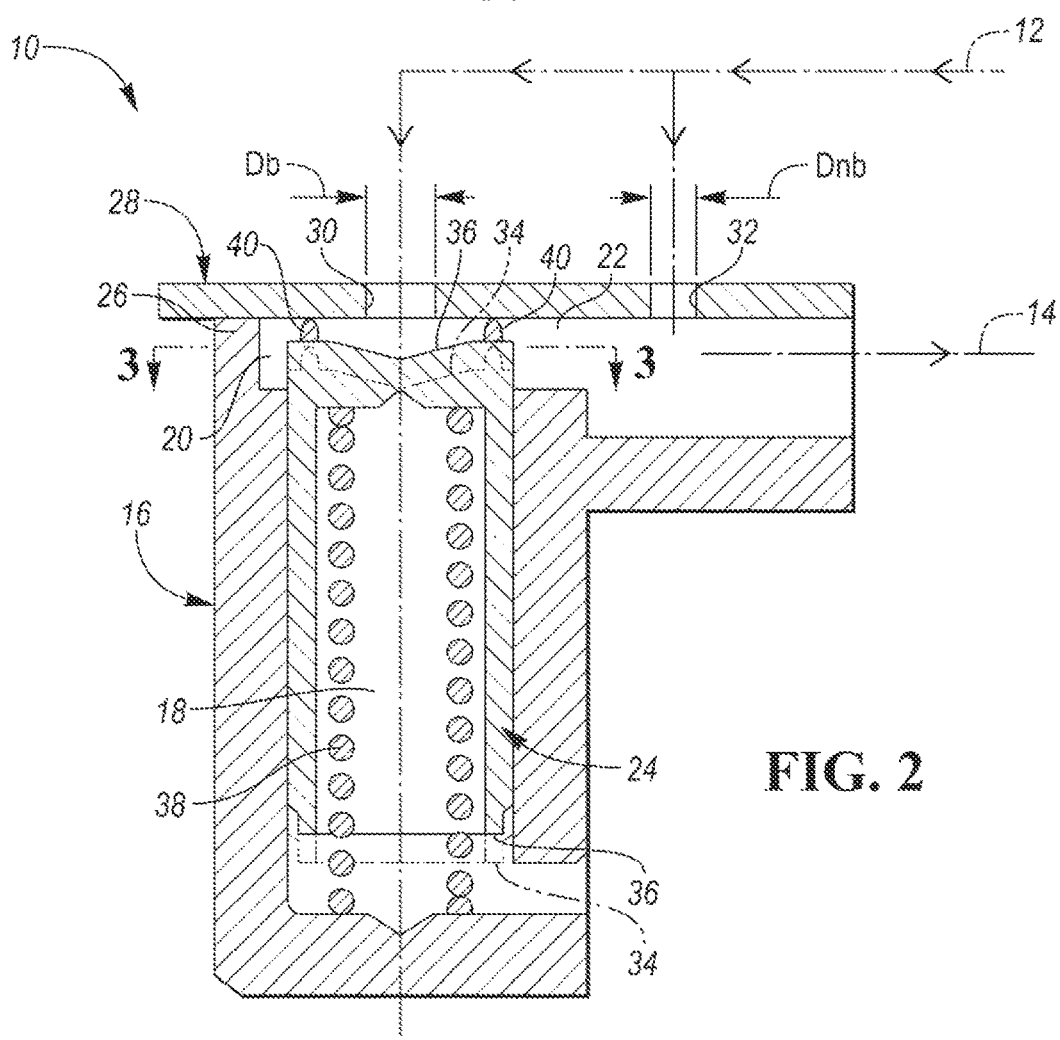
FIG. 2 is a cross-sectional view of the boost valve taken along line 2-2 in FIG. 1.
Figure 3:
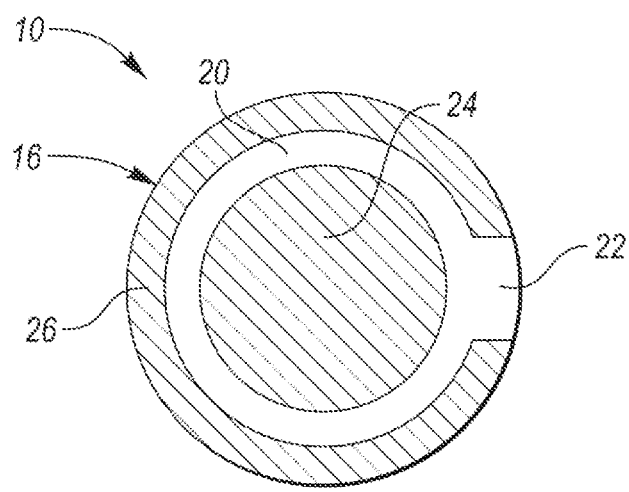
FIG. 3 is a cross-sectional view of the housing and the piston of the boost valve taken along line 3-3 in FIG. 2.

Referring to FIGS. 1-3, a hydraulic boost valve 10 is illustrated. Boost valves are configured to significantly increase the fluid flow being output from the boost valve in response to the fluid pressure being delivered to the boost valve exceeding a threshold. The boost valve 10 may be utilized in any hydraulic system. For example, the boost valve may be utilized in a transmission of a vehicle and may be configured to increase the fluid flow being delivered to a torque converter, a clutch, a balanced dam, or any other transmission component, in response to the inlet pressure of the boost valve exceeding the threshold. A fluid input circuit 12 is configured to deliver hydraulic fluid to the boost valve 10. The boost valve 10 is then configured to deliver the hydraulic fluid to a fluid output circuit 14. The fluid input circuit 12 may include a fluid reservoir (e.g., a sump in a transmission case) and a pump (not shown) that is configured to deliver hydraulic fluid to the boost valve 10. The fluid output circuit 14 may include any downstream device that requires hydraulic fluid (e.g., a torque converter, a clutch, a balanced dam, etc.). The fluid output circuit 14 may also be configured to return to the fluid reservoir once the downstream device has utilized the hydraulic fluid for its intended purpose.

The boost valve 10 includes a housing 16. The housing 16 defines an axially extending internal cavity 18, a groove or slot 20 that extends radially outward from the internal cavity 18 within the housing 16, and an outlet port 22 that establishes fluid communication between the slot 20 and the fluid output circuit 14. More specifically, the slot 20 and the outlet port 22 may be defined along and end of the housing 16. A piston 24 is disposed within the internal cavity 18. The piston 24 is disposed within the internal cavity 18 such that the slot 20 is positioned between the piston 24 and an external wall 26 of the housing 16. More specifically, the slot 20 may extend around the entire perimeter or circumference of the piston 24 between the perimeter or circumference of the piston 24 and the external wall 26 of the housing 16.

A valve seat 28 is secured to an end of the housing 16. More specifically, the valve seat 28 may secured to the end of the housing 16 that defines the slot 20 and the outlet port 22, such that the slot 20 and the outlet port 22 are adjacent to (e.g., next to) the valve seat 28. The valve seat 28 may be disposed over the slot 20 and the outlet port 22 such that the slot 20 and the outlet port 22 are "sandwiched" between the housing 16 and the valve seat 28. The valve seat 28 defines a boost orifice 30 and a non-boost orifice 32. The boost orifice 30 and the non-boost orifice 32 may be referred to as the first and second orifices. The boost orifice 30 establishes fluid communication between the fluid input circuit 12 and the outlet port 22 via the slot 20 when the piston 24 is an opened position 34. When the piston 24 is in a closed position 36, the piston 24 prevents and obstructs fluid communication between the boost orifice 30 and the outlet port 22 via the slot 20. It should be noted that fluid communication is also prevented and obstructed between the boost orifice 30 and the slot 20 when the piston 24 is in the closed position 36. A spring 38 may bias the piston 24 into the closed position 36 The non-boost orifice 32 establishes fluid communication between the fluid input circuit 12 and the fluid output circuit 14.

Figure 4:
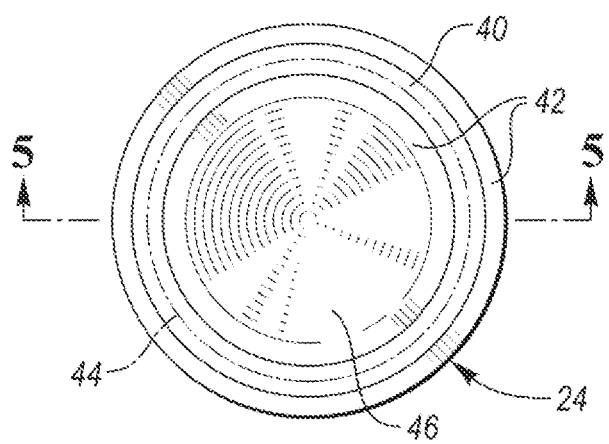
FIG. 4 is a top view of the piston of the boost valve.
Figure 5:
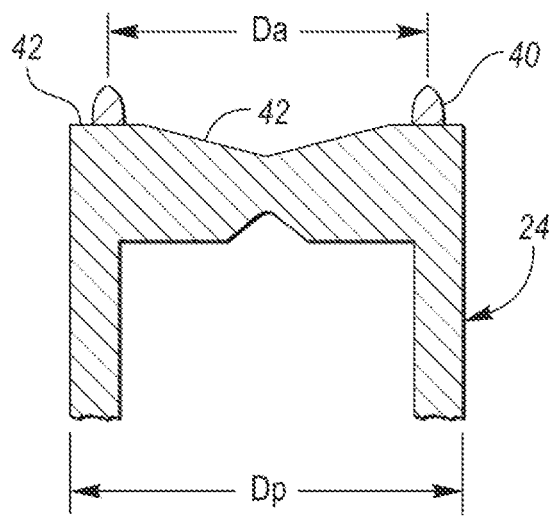
FIG. 5 is a partial cross-sectional view of the piston taken along line 5-5 in FIG. 4.

Referring to FIGS. 2, 4, and 5, the piston 24 and the functionality of the boost valve 10 are described in further detail. The piston 24 includes a protrusion 40 that extends upward from a top surface 42 of the piston 24. The protrusion 40 engages the valve seat 28 along a contact line 44 when the piston 24 is in the closed position 36 to prevent and obstruct fluid communication between the boost orifice 30 and the outlet port 22 via the slot 20. The protrusion 40 disengages the valve seat 28 when the piston 24 is in the opened position 34 to establish to fluid communication between boost orifice 30 and the outlet port 22 via the slot 20. The protrusion 40 may be concave in shape such that the end of the protrusion that engages the valve seat 28 will engage the valve seat 28 along a singular line of contact (i.e., the contact line 44). The protrusion 40 forms a closed loop around a boost flow force region 46. The boost flow force region 46 includes an area of the piston 24 that is surrounded by the contact line 44, including portions of the top surface 42 of the piston 24 and portions of the protrusion 40 that are internal relative to the contact line 44. The boost flow force region 46 is an area that is open to the hydraulic pressure of the fluid flowing through the boost orifice 30. The hydraulic pressure acting on the boost flow force region 46 may be referred to as the active pressure acting on the piston 24. Along the exterior of the contact line 44, portions of the piston 24 and protrusion 40 are open to the pressure of the hydraulic fluid flowing through the non-boost orifice 32. The hydraulic pressure acting on the portions of the piston 24 and protrusion 40 that are exterior of the contact line 44 may be referred to as the feedback pressure acting on the piston 24.

The boost flow force region 46 includes a diameter $D_a$ and the piston 24 as a whole has a diameter of $D_p$. As the ratio $D_a/D_p$ (or the ratio of the area of boost flow force region 46 relative to the area of the top of the piston 24 as a whole) increases, the hydraulic pressure acting on the piston 24 that is required to transition the piston 24 from the closed position 36 to the opened position 34 decreases. The piston may be designed such that the ratio of diameter of boost flow force region 46 relative to the diameter of the piston 24 as a whole ($D_a/D_p$) has a value that is equal to or less than 0.9. The diameter of the flow force region $D_a$ should be greater than the diameter of boost orifice $D_b$.

The boost valve 10 is configured to continuously supply hydraulic fluid to the fluid output circuit 14 as long as the fluid input circuit 12 is supply hydraulic fluid to the boost valve 10. However, when the supply pressure is smaller than a threshold pressure required to overcome the force of the spring 38, the piston 24 will remain in the closed position 36 and the hydraulic fluid will only flow into the fluid output circuit 14 from the fluid input circuit 12 via the non-boost orifice 32 and not through the boost orifice 30. When the supply pressure is greater than the threshold pressure required to overcome the force of the spring 38, the piston 24 will transition to the opened position 36 and hydraulic fluid will flow into the output circuit 14 from the fluid input circuit 12 through the non-boost orifice 32 and the boost orifice 30. Specifically, hydraulic fluid will flow into the output circuit 14 from the fluid input circuit 12 through the boost orifice 30 via the slot 20 and outlet port 22. Once the piston 24 transitions to the opened position 34, the hydraulic fluid flowing into the fluid output circuit 14 from the fluid input circuit 12 is significantly increased (i.e., is boosted). The rate at which the hydraulic fluid flowing into the fluid output circuit 14 from the fluid input circuit 12 increases (once the piston 24 begins to transition to the opened position 34) is a function of the ratio of the diameter $D_b$ (or area) of the boost orifice 30 relative to the diameter $D_{nb}$ (or area) of the non-boost orifice 30. As the ratio $D_b/D_{nb}$ (or the ratio of the area of the boost orifice 30 relative to the area of the non-boost orifice 32) increase, the rate at which the hydraulic fluid flowing into the fluid output circuit 14 from the fluid input circuit 12 also increases. The boost valve 10 may be designed such that the ratio of the diameter of the boost orifice 30 relative to the diameter of the non-boost valve 32 ($D_b/D_{nb}$) is equal to or greater than 1. A higher value of the $D_b/D_{nb}$ may provide a greater flow boost rate.

Hydraulic systems in vehicles, and more specifically in automatic transmissions, driveline lubrication systems, and engine lubrication systems, may use flow boost valves for increasing the flow rate (i.e., boosting) of hydraulic fluid when the line pressure (e.g., the pressure of the fluid in the circuit, such as the fluid input circuit 12, that delivers hydraulic fluid to the boost valve 10) exceeds a threshold value. Current boost valves systems utilize a plurality of spring loaded or solenoid operated spool or ball/piston type check valves to increase the flow rate of the hydraulic fluid.

The current boost valve systems, however, produce a large pressure hysteresis resulting in the boost valves opening and closing at different pressures. The magnitude of such hysteresis increases as the surface area of valve seat increases. Since a sealing area between piston/ball face and valve seat is necessary to prevent leakage, hysteresis is almost unavoidable. Additionally, the rate of flow boost (i.e., the rate at which flow through the boost valve increases once the boost valve is opened) is typically constant and primarily depends on the valve geometry.

The boost valve 10 disclosed herein, reduces pressure hysteresis (hysteresis approaches zero), provides a quick flow boost when line pressure exceeds a threshold value, and allows for different flow boost rates by adjusting the size of the external orifices (i.e., the boost orifice 30 and non-boost orifice 32) during the design of the boost valve, and operates without causing flow induced noise, vibration, and harshness (NVH) issues. This boost valve 10 is a standalone device that does not require an external control system. The design of boost valve 10 includes a constant active flow force area on the piston (i.e., the area of the piston upon which fluid pressure is acting to force the piston into an opened position—the boost flow force region 46), regardless if the piston 24 is in the opened position 34 or the closed position 36, allowing the valve 10 to operate with almost zero or negligible hysteresis. More specifically, the protrusion 40 on the top surface 42 of the piston 24 allows for a constant active flow force area on the piston, regardless if the piston 24 is in the opened position 34 or closed position 36. The balance groove (i.e., the slot 20) defined in the housing 16 eliminates a side load effect on the piston 24 by equalizing the hydraulic pressure around the outer diameter or perimeter of the piston.

The protrusion 40 on the piston 24 makes a line contact with the valve seat 28 (i.e., along the contact line 44). The line contact enables the boost flow force to be applied to the boost flow force region 46 and a feedback pressure to be applied on the outer region of the piston 24 relative to the protrusion 40 via the slot 20 through the outlet port 22 and non-boost orifice 32. This allows the entire piston face area (i.e., the entire the top surface 42 of the piston 24) to serve as an active flow force area regardless if the piston 24 is in the opened position 34 or closed position 36. In addition, the protrusion 40 generates a sharp orifice effect when the boost flow fluid (i.e., fluid flowing from the fluid input circuit 12 the to the fluid output circuit 14 via the boost orifice 30) passes over the protrusion, resulting a negligible frictional resistance when the boost valve 10 is partially open. The balance groove (i.e., the slot 20) enables a uniform feedback pressure on the circumference of the piston, which eliminates a side load effect and reduces frictional wear to the piston 24 and/or the housing 16. The balance groove (i.e., the slot 20) provides a wide-open exhaust flow chamber through the outflow port 22, resulting in minimum or negligible hydraulic resistance on the boost flow when the valve is at opened condition.

The boost orifice 30 and the non-boost orifice 32 are defined by a separator plate (i.e., the valve seat 28). The flow boost rate can be adjusted by changing the sizing of the boost orifice 30 and the non-boost orifice 32 without replacing or changing the design of the boost valve 10. The pressure threshold required for the boost valve 10 to reach lift off (i.e., where the piston 24 transitions from the closed position 36 to the opened position 34) can be adjusted by selecting a spring 38 with a specific stiffness and/or adjusting the preload of the spring 38. The dimensions of the protrusion 40, the boost orifice 30, the non-boost orifice 32, the flow paths (e.g., the fluid input circuit 12 or fluid output circuit 14), the balance groove (i.e., slot 20), the piston 24, and the housing 16 may be adjusted based on the desired application of the boost valve 10, and can be fitted to the pressure regulation and durability requirements of a specific system.

When the supply line pressure (i.e., the pressure of the fluid input circuit 12) is below a specified threshold pressure, the boost valve 10 is closed (i.e., the piston 24 is in the closed position 36) and the fluid from the fluid input circuit 12 flows through the non-boost orifice 32 only to the fluid output circuit 14. In the closed state, supply line pressure force (the force produced by the pressure of the fluid in the fluid input circuit 12) is applied on the inner region of the piston face (i.e., the boost flow force region 46) through the boost orifice 30 and the feedback pressure (downstream pressure) is applied on outer region of the piston 24 (i.e., along the exterior of the contact line 44) via the slot 20 through the outlet port 22 and non-boost orifice 32. When the supply line pressure (the pressure of the fluid in the fluid input circuit 12) exceeds the threshold pressure, the piston 24 transitions to the opened position 34 and increases the overall flow rate to the fluid output circuit 14. When the boost valve 10 is in such an open state, the protrusion 40 generates an orifice effect when the fluid flow through boost orifice 30 passes over the protrusion 40 to outlet 22. Due to this orifice effect, the boost flow fluid pressure is less on the protrusion 40 than the fluid pressure on the active flow force region 46. After the fluid passes over the protrusion, the fluid pressure increases again in the slot 20 and this pressure is equal to the feedback pressure exerted by the non-boost fluid flow. Thus, the boost flow pressure is applied on the active flow force region 46 and the feedback pressure is applied on the outer region of the piston 24. This phenomena of the application of pressure is similar to the phenomena that occurs when the valve is in closed state. As a consequence, regardless if the valve 10 opening or closing, the pressure hysteresis (the pressure difference between transitioning the piston 24 to the opened position 34 and transitioning the piston 24 to the closed position 36) is negligible (less than 1% in the current boost valve 10, whereas more than 25% is typical in conventional boost valve designs) resulting in smooth operation of the valve with minimal NVH issues. The percentage of pressure hysteresis depends on the diameter of the diameter of the protrusion 40 (i.e., diameter $D_a$ of the boost flow force region 46 includes) and the diameter $D_p$ of the piston 24 as a whole, the size of boost orifice 30, and the size of the non-boost orifice 32.

Figure 6:
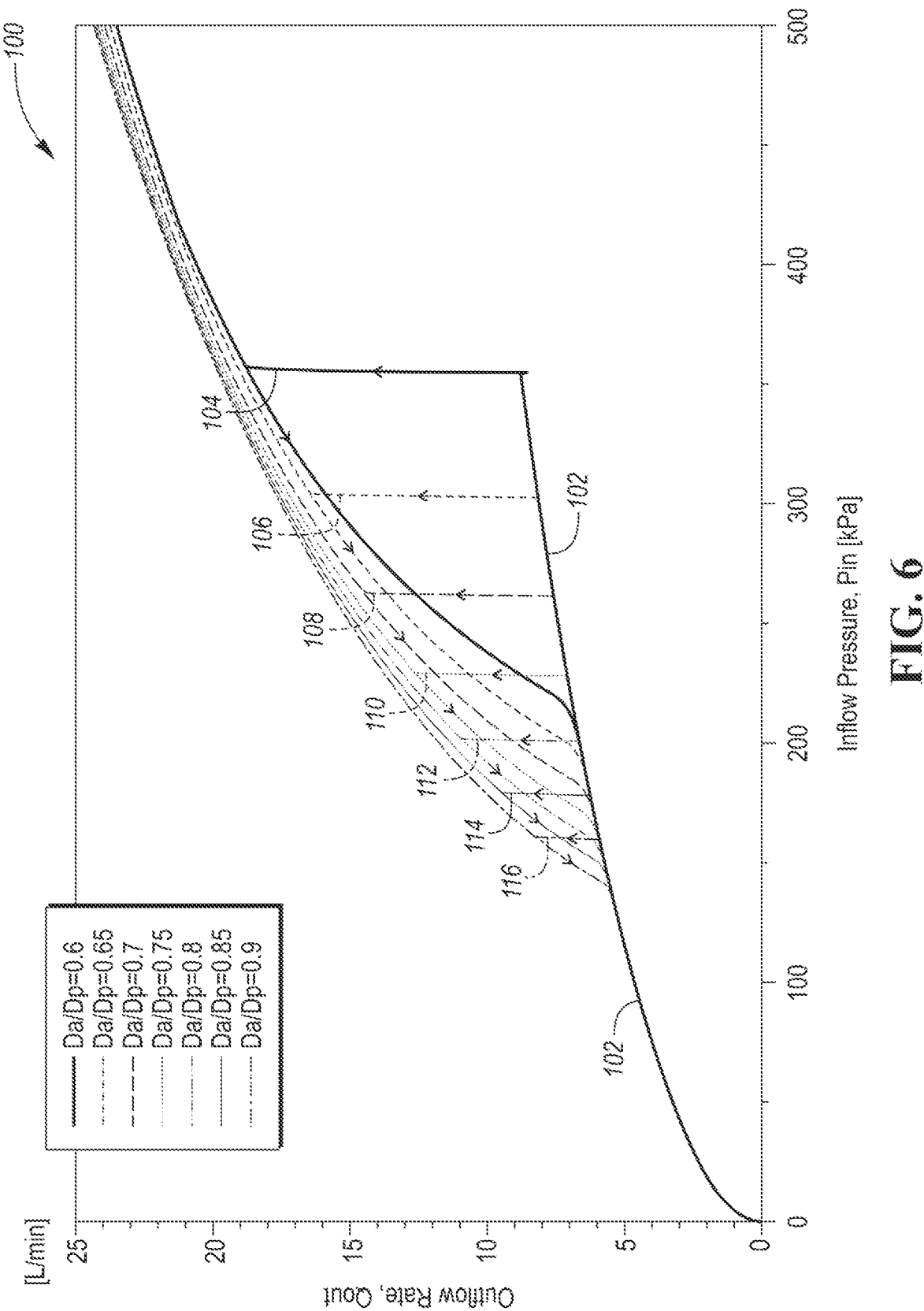
FIG. 6 is a graph illustrating the outflow rate of a conventional boost valve relative to inflow pressure at various ratios of the active piston face diameter relative to the piston diameter.

Referring to FIG. 6, a graph 100 of the outflow rate of a conventional boost valve relative to inflow pressure at various ratios of the active piston face diameter $D_a$ relative to the piston diameter $D_p$ is illustrated. The bottom line 102 within the graph illustrates the fluid flow rate through the conventional boost valve when the piston of the conventional boost valve is in the closed position such that fluid is only flowing through a non-boost orifice of the boost valve. The several lines 104, 106, 108, 110, 112, 114, and 116 extend upward from the bottom line 102 and eventually return to the bottom line 102. The several lines 104, 106, 108, 110, 112, 114, and 116 illustrate the fluid flow rate through the conventional boost valve when the piston of the conventional boost valve is in the opened position such that fluid is flowing through a boost orifice and the non-boost orifice of the conventional boost valve. The points at which the several lines 104, 106, 108, 110, 112, 114, and 116 begin to extend upward from the bottom line 102 (as indicated by the upward arrows) coincide with the pressure at which the piston of the conventional boost valve transitions to the opened position from the closed position allowing fluid to flow through the boost orifice. The points at which the several lines 104, 106, 108, 110, 112, 114, and 116 return to the bottom line 102 (as indicated by the left and downward facing arrows) coincide with the pressure at which the piston of the conventional boost valve transitions to the closed position from the opened position to obstruct fluid flow through the boost orifice.

The graph 100 clearly illustrates a much lower pressure is required to transition to the piston of the conventional boost valve to the closed position from the opened position as opposed to the pressure required to transition the piston of the conventional boost valve to the open position from the closed position. In some cases (e.g., line 104) the difference (i.e., the hysteresis) in pressure required to open the piston of the conventional boost valve relative to the pressure required to close the piston of the conventional boost valve exceeds a value of 100 kPa. The graph also illustrates that as the ratio of the diameter of the boost flow force region of the conventional boost valve relative to the diameter of the piston of the conventional boost valve as a whole ($D_a/D_p$) increases, the pressures required to open and close the piston of the conventional boost valve decrease and that the relative hysteresis between opening and closing the piston of the conventional boost valve also decreases.

Figure 7:
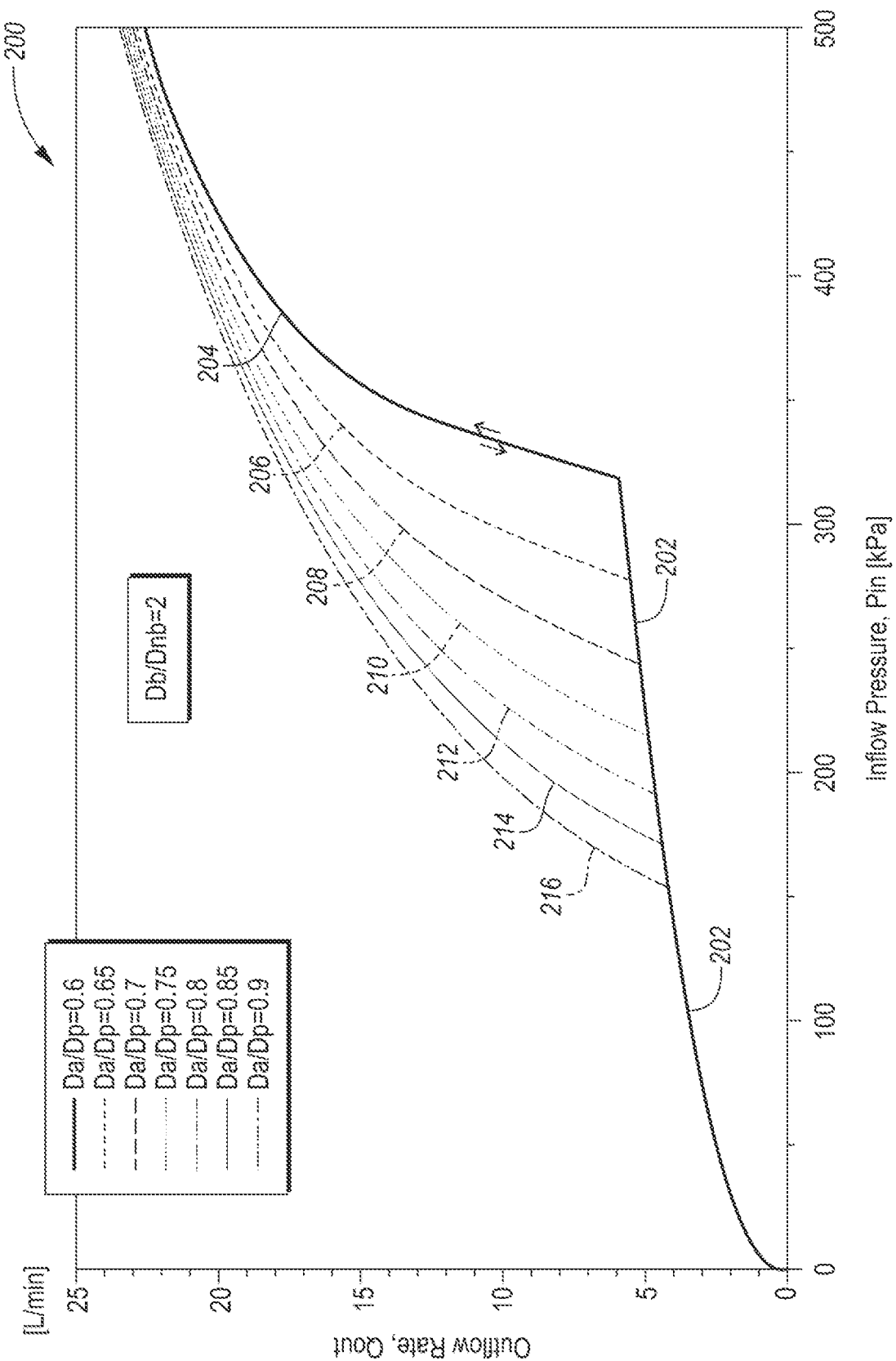
FIG. 7 is a graph illustrating the outflow rate of the new boost valve design relative to inflow pressure at various ratios of the active piston face diameter relative to the piston diameter.

Referring to FIG. 7, a graph 200 of the outflow rate of the new boost valve design 10 relative to inflow pressure at various ratios of the active piston face diameter $D_a$ relative to the piston diameter $D_p$ is illustrated. The graph in FIG. 7 also includes a constant $D_b/D_{nb}$ ratio having a value of 2. The bottom line 202 within the graph illustrates the fluid flow rate through the boost valve 10 when the piston 24 is in the closed position 36 such that fluid is only flowing through the non-boost orifice 32. The several lines 204, 206, 208, 210, 212, 214, and 216 extend upward from the bottom line 202 and eventually return to the bottom line 202. The several lines 204, 206, 208, 210, 212, 214, and 216 illustrate the fluid flow rate through the boost valve 10 when the piston 24 is in the opened position 34 such that fluid is flowing through the boost orifice 30 and the non-boost orifice 32. The points at which the several lines 204, 206, 208, 210, 212, 214, and 216 begin to extend upward from the bottom line (as indicated by the upward arrows) coincide with the pressure at which the piston 24 transitions to the opened position 34 from the closed position 36. The points at which the several lines 204, 206, 208, 210, 212, 214, and 216 return to the bottom line 202 (as indicated by the downward facing arrows) coincide with the pressure at which the piston 24 transitions to the closed position 36 from the opened position 34. Like the conventional boost valve, FIG. 7 demonstrates that as the ratio of the diameter of the boost flow force region 46 relative to the diameter of the piston 24 as a whole ($D_a/D_p$) increases, the pressures required to open and close the piston 24 decreases. However, FIG. 7 also demonstrates that the relative hysteresis between opening and closing the piston 24 of the boost valve 10 approaches zero and is negligible regardless of the ratio of the diameter of the boost flow force region 46 relative to the diameter of the piston 24 as a whole ($D_a/D_p$).

Figure 8:
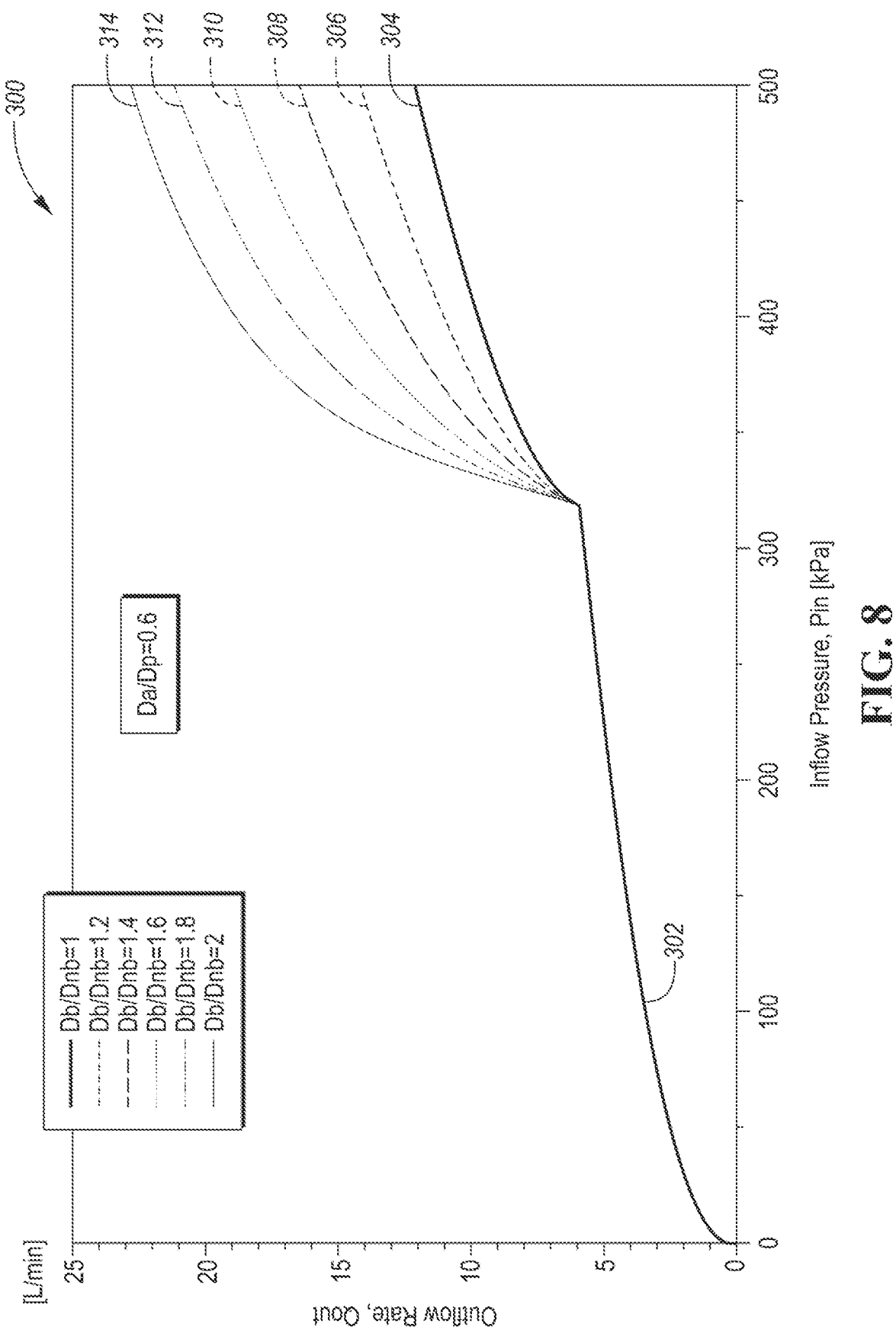
FIG. 8 is a graph illustrating the outflow rate of the new boost valve design relative to inflow pressure at various ratios of the boost orifice diameter relative to the non-boost orifice diameter.

Referring to FIG. 8, a graph 300 of the outflow rate of the new boost valve design 10 relative to inflow pressure at various ratios of the boost orifice diameter ($D_b$) relative to the non-boost orifice diameter ($D_{nb}$) is illustrated. The graph in FIG. 8 also includes a constant $D_a/D_p$ ratio having a value of 0.6. The bottom line 302 within the graph illustrates the fluid flow rate through the boost valve 10 when the piston 24 is in the closed position 36 such that fluid is only flowing through the non-boost orifice 32. Several lines 304, 306, 308, 310, 312, and 314 extend upward from the bottom line 302 at the same point. The several lines 304, 306, 308, 310, 312, and 314 illustrate the fluid flow rate through the boost valve 10 when the piston 24 is in the opened position 34 such that fluid is flowing through the boost orifice 30 and the non-boost orifice 32. The points at which the several lines 304, 306, 308, 310, 312, and 314 extend upward from the bottom line coincide with the pressure at which the piston 24 transitions to the closed position 36 from the opened position 34. The graph 300 illustrates that the rate at which fluid flow increases once the piston 24 has been transferred to the open position 34 will increase as the $D_b/D_{nb}$ ratio increases.

Figure 9:
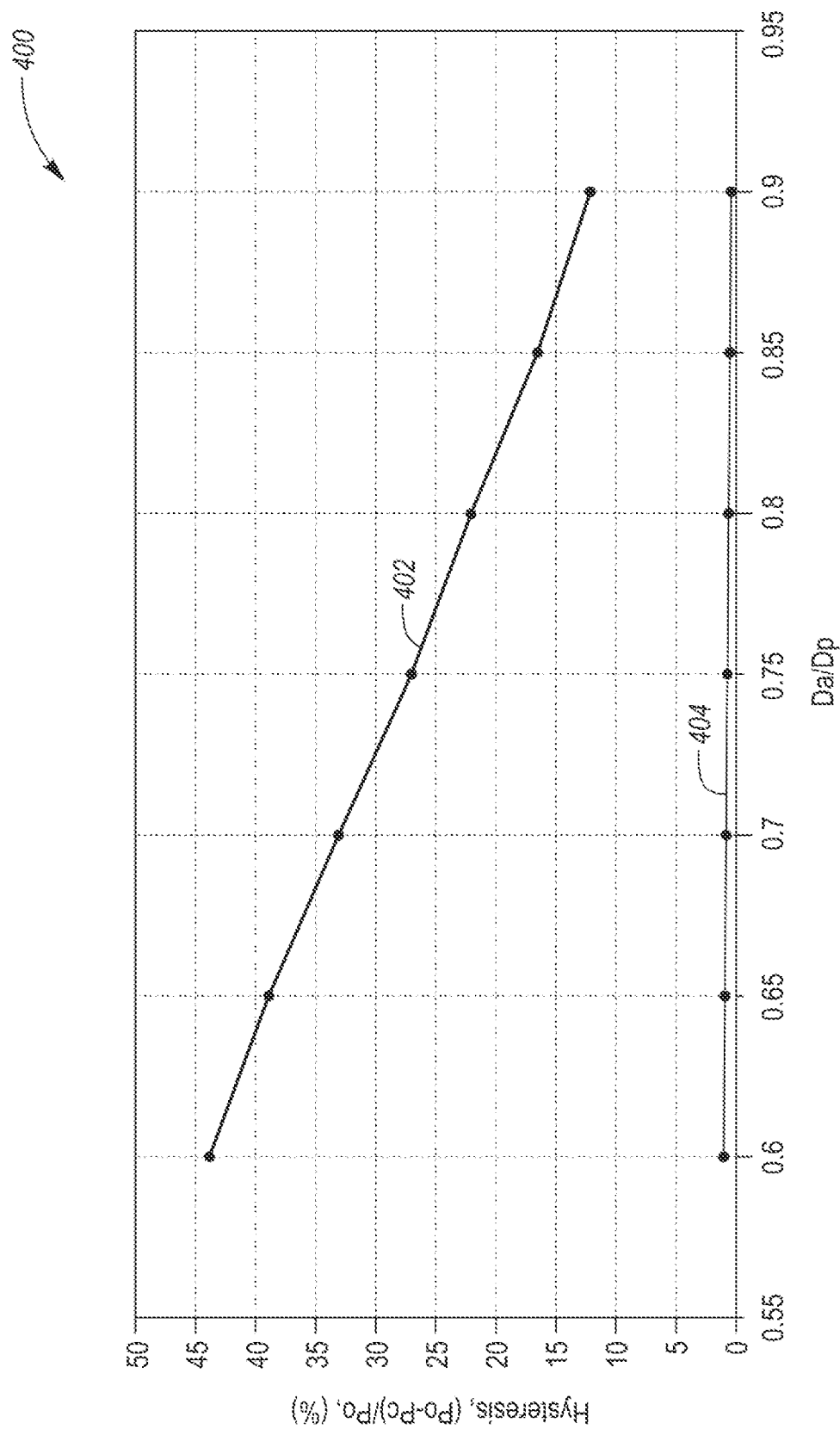
FIG. 9 is graph comparing the pressure hysteresis between opening and closing a conventional boost valve relative to the pressure hysteresis between opening and closing the new boost valve design.

Referring to FIG. 9, a graph 400 comparing the pressure hysteresis between opening and closing a conventional boost valve relative to the pressure hysteresis between opening and closing the new boost valve design 10 is illustrated. Line 402 illustrates the pressure hysteresis between opening and closing a conventional boost valve at various $D_a/D_p$ ratios while line 404 illustrates the pressure hysteresis between opening and closing the new boost valve design 10 at various $D_a/D_p$ ratios. Line 402 illustrates that the pressure hysteresis of the conventional boost valve has a value ranges between approximately 12% and 43% at $D_a/D_p$ ratios that range between 0.6 and 0.9. Line 404, on the other hand, illustrates that the pressure hysteresis of the new boost valve design 10 has a negligible value (i.e., less than 1%) at $D_a/D_p$ ratios that range between 0.6 and 0.9.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A hydraulic boost valve comprising:

a housing defining an axially extending internal cavity, a slot that extends radially outward from the internal cavity within the housing, and an outlet port that establishes fluid communication between the slot and a fluid output circuit;

a valve seat secured to an end of the housing, the valve seat terminating along a bottom surface, the bottom surface defining first and second orifices, wherein the first and second orifices are positioned on opposing sides of the outlet port, the first orifice establishes fluid communication between a fluid input circuit and the outlet port via the slot, and the second orifice directly establishes fluid communication between the fluid input circuit and the fluid output circuit; and a piston disposed within the internal cavity such that the slot is positioned radially about the piston and between the piston and an external wall of the housing, wherein the piston includes a protrusion that extends upward from a top surface of the piston, wherein an upper end of the protrusion engages the bottom surface of the valve seat along a singular line of contact that is radially outward of and around the first orifice when the piston is in a closed position such that the engagement between the protrusion and the bottom surface forms a closed loop around the first orifice to obstruct fluid communication between the first orifice and the outlet port via the slot, and wherein the protrusion disengages the valve seat when the piston is in an opened position to establish to fluid communication between the first orifice and the outlet port via the slot.

2. The hydraulic boost valve of claim 1, wherein the closed loop is formed around a boost force region on the top surface of the piston.

3. The hydraulic boost valve of claim 2, wherein a ratio between a diameter of the boost force region to an outer diameter of the piston has a value that is equal to or less than 0.9.

4. The hydraulic boost valve of claim 1, wherein the protrusion includes first and second opposing concave surfaces that intersect to form a tip at the upper end.

5. The hydraulic boost valve of claim 4, wherein the tip engages the bottom surface of the valve seat along the contact line when the piston is in the closed position.

6. The hydraulic boost valve of claim 1, wherein a ratio between a diameter of the first orifice and a diameter of the second orifice has a value that is equal to or greater than 1.

7. The hydraulic boost valve of claim 1, wherein the slot extends radially outward from the internal cavity within the housing along an end of the housing and adjacent to the valve seat.

8. A hydraulic boost valve comprising:
a housing defining an axially extending internal cavity, a slot that extends radially outward from the internal cavity within the housing, and an outlet port that establishes fluid communication between the slot and a fluid output circuit;
a valve seat secured to an end of the housing, the valve seat terminating along a bottom surface, the bottom surface defining first and second orifices, wherein the first and second orifices are positioned on opposing sides of the outlet port, the first orifice establishes fluid communication between a fluid input circuit and the outlet port via the slot, and the second orifice directly establishes fluid communication between the fluid input circuit and the fluid output circuit; and
a piston disposed within the internal cavity such that the slot is positioned radially about the piston and between the piston and an external wall of the housing, wherein the piston is configured to transition to an opened position to establish to fluid communication between the first orifice and the outlet port via the slot and to transition to a closed position to obstruct fluid communication between the first orifice and the outlet port via the slot, wherein the piston includes a concave protrusion that extends upward from a top surface of the piston that engages the bottom surface of the valve seat along a singular line of contact that is radially outward of and around the first orifice when the piston is in the closed position such that the engagement between the protrusion and the bottom surface forms a closed loop around the first orifice to obstruct fluid communication between the first orifice and the outlet port via the slot, and wherein the protrusion disengages the valve seat when the piston is in the opened position to establish to fluid communication between the first orifice and the outlet port via the slot.

9. The hydraulic boost valve of claim 8, wherein the closed loop is formed around a boost force region on the top surface of the piston.

10. The hydraulic boost valve of claim 8, wherein a ratio between a diameter of the boost force region to an outer diameter of the piston has a value that is equal to or less than 0.9.

11. The hydraulic boost valve of claim 8, wherein a ratio between a diameter of the first orifice and a diameter of the second orifice has a value that is equal to or greater than 1.

12. The hydraulic boost valve of claim 8, wherein the slot extends radially outward from the internal cavity within the housing along an end of the housing and adjacent to the valve seat.

13. The hydraulic boost valve of claim 8, wherein the concave protrusion includes first and second opposing concave surfaces that intersect to form a tip.

14. The hydraulic boost valve of claim 13, wherein the tip engages the bottom surface of the valve seat along the contact line when the piston is in the closed position.

15. A hydraulic boost valve comprising:
a housing defining an axially extending internal cavity and an outlet port, wherein the outlet port is in fluid communication with a fluid output circuit;
a valve seat secured to an end of the housing, the valve seat terminating along a bottom surface, the bottom surface defining first and second orifices, wherein the first and second orifices are positioned on opposing sides of the outlet port, the first orifice establishes fluid communication between a fluid input circuit and the outlet port, and the second orifice directly establishes fluid communication between the fluid input circuit and the fluid output circuit; and
a piston disposed within the internal cavity, wherein the piston includes a protrusion that extends upward from a top surface of the piston, wherein an upper end of the protrusion engages the bottom surface of the valve seat along a singular line of contact that is radially outward of and around the first orifice when the piston is in a closed position such that the engagement between the protrusion and the bottom surface forms a closed loop around the first orifice to obstruct fluid communication between the first orifice and the outlet port, and wherein the protrusion disengages the valve seat when the piston is in an opened position to establish to fluid communication between the first orifice and the outlet port.

16. The hydraulic boost valve of claim 15, wherein the closed loop is formed around a boost force region on the top surface of the piston.

17. The hydraulic boost valve of claim 16, wherein a ratio between a diameter of the boost force region to an outer diameter of the piston has a value that is equal to or less than 0.9.

18. The hydraulic boost valve of claim 15, wherein the protrusion includes first and second opposing concave surfaces that intersect to form a tip at the upper end.

19. The hydraulic boost valve of claim 18, wherein the tip engages the bottom surface of the valve seat along the contact line when the piston is in the closed position.

20. The hydraulic boost valve of claim 15, wherein the housing further defines a slot that extends radially outward from the internal cavity within the housing, and wherein outlet port establishes fluid communication between slot and the fluid output circuit.

\* \* \* \* \*